Dec. 23, 1941.     G. ELLEN     2,267,327
APPARATUS FOR SCREENING
Filed Aug. 4, 1939     3 Sheets-Sheet 1
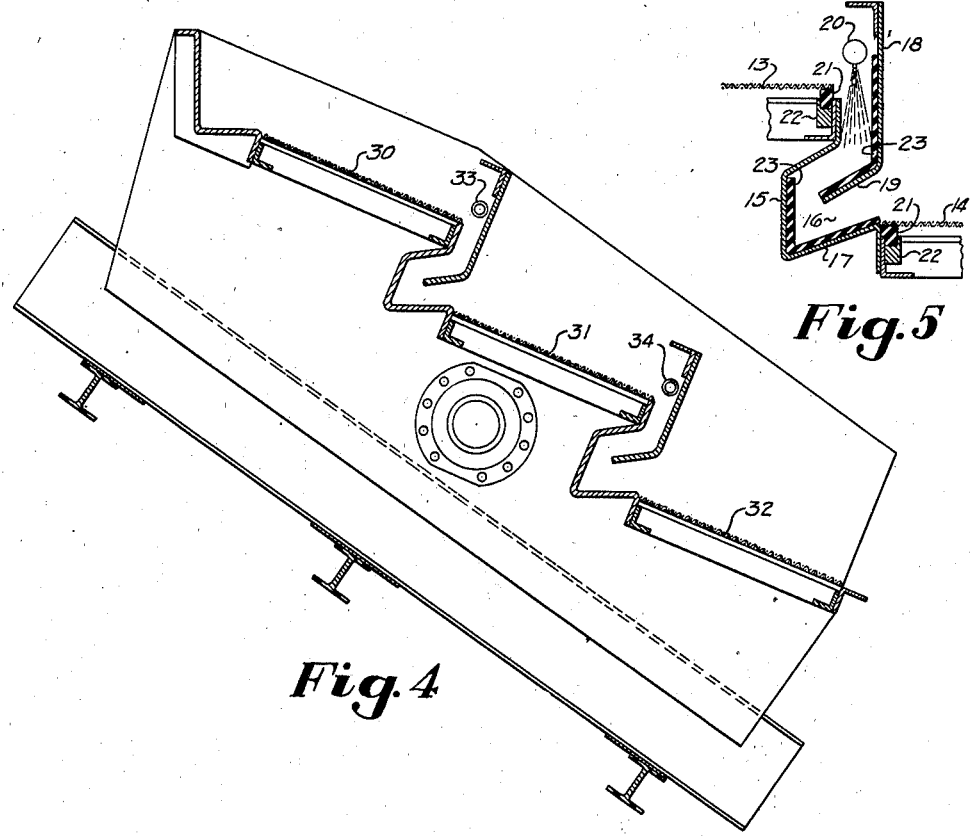
Fig. 5
Fig. 4
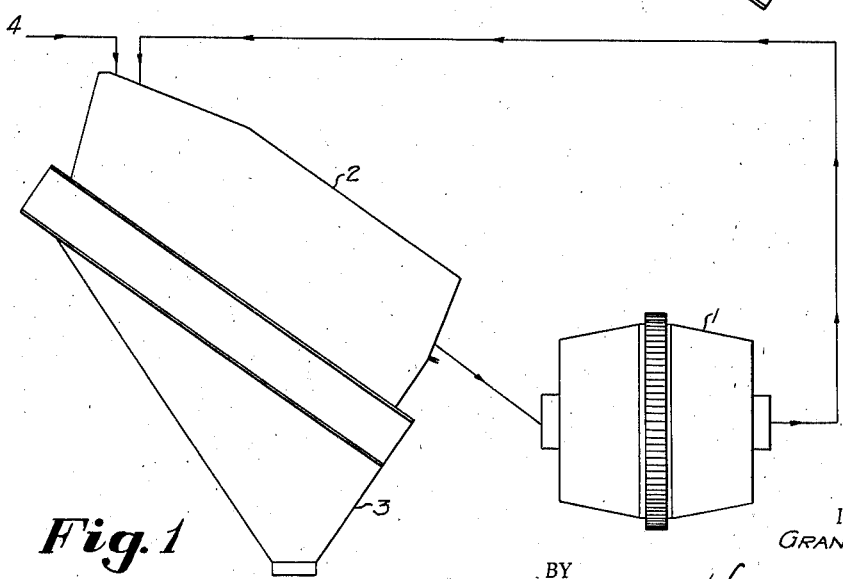
Fig. 1
INVENTOR.
GRANT ELLEN
BY
ATTORNEY.

Dec. 23, 1941.  G. ELLEN  2,267,327
APPARATUS FOR SCREENING
Filed Aug. 4, 1939  3 Sheets-Sheet 2

INVENTOR.
GRANT ELLEN
BY Horace B. Fay
ATTORNEY.

Dec. 23, 1941.　　　　G. ELLEN　　　　2,267,327
APPARATUS FOR SCREENING
Filed Aug. 4, 1939　　　3 Sheets-Sheet 3

INVENTOR.
GRANT ELLEN
BY
Horace B. Fay
ATTORNEY.

Patented Dec. 23, 1941

2,267,327

UNITED STATES PATENT OFFICE 2,267,327

APPARATUS FOR SCREENING

Grant Ellen, St. Catharines, Ontario, Canada, assignor to The W. S. Tyler Company, Cleveland, Ohio, a corporation of Ohio Application August 4, 1939, Serial No. 288,399

4 Claims. (Cl. 209—269)

This invention relates, as indicated, to apparatus for screening, but has reference more particularly to methods of and apparatus for the wet screening of materials such as ores and concentrates, both metallic and non-metallic, cement slurry, clay slip, silica sand, etc.

In the wet screening of the aforesaid materials, it has heretofore been customary to form a "pulp" consisting of water and the material to be screened, which pulp is deposited upon the screen, which may be vibrated, oscillated, gyrated or otherwise actuated to cause or facilitate a screening of such material.

The purpose of such screening is to cause the undersize material which is to pass through the screen to pass therethrough together with the water in the pulp, so that little or no water remains with the oversize material left upon the screen.

Due, however, to various factors which have not as yet been fully analyzed or otherwise determined, wet screening is usually characterized by the fact that the water, which forms a part of the pulp, passes through the screen at a more rapid rate than the undersize material, all of which, theoretically, should pass through the screen with such water, so that the screening of the undersize material ceases when all of the water has passed through the screen. This is due to the entrainment of the undersize material in the mass of oversize material. As a result, a part of the undersize material or fines is needlessly passed through the ball mill or other grinding device together with the oversize material, which is to be reground.

The present invention has, as its primary object, the provision of a method of wet screening, whereby substantially complete recovery of the material to be screened is effected in a single screening operation, and without appreciable increase in the cost or equipment required for ordinary wet screening.

Another object of the invention is to provide apparatus which is particularly adapted for the purpose at hand.

Other objects and advantages of the invention will be apparent during the course of the following description.

In the accompanying drawings, forming a part of this specification,

Fig. 1 is a view illustrating diagrammatically the use of apparatus embodying the invention in a typical closed-circuit grinding operation;

Fig. 4 is a view similar to Fig. 2, but showing the use of three stages of screening in a single screen body;

Fig. 5 is a fragmentary cross-sectional view, illustrating a desired construction of the apparatus shown in Figs. 2 and 4;

Figure 3:
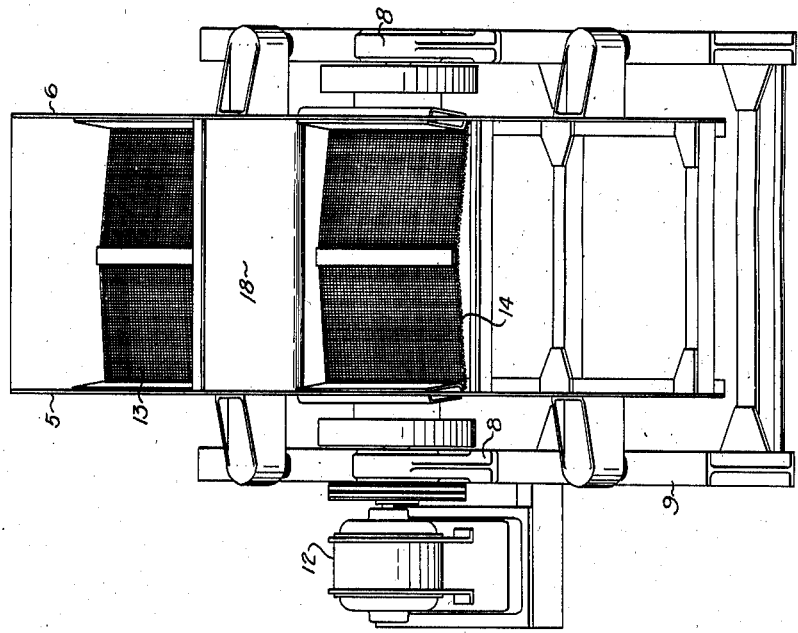
Fig. 3 is an end elevation of the apparatus shown in Fig. 2.
Figure 2:
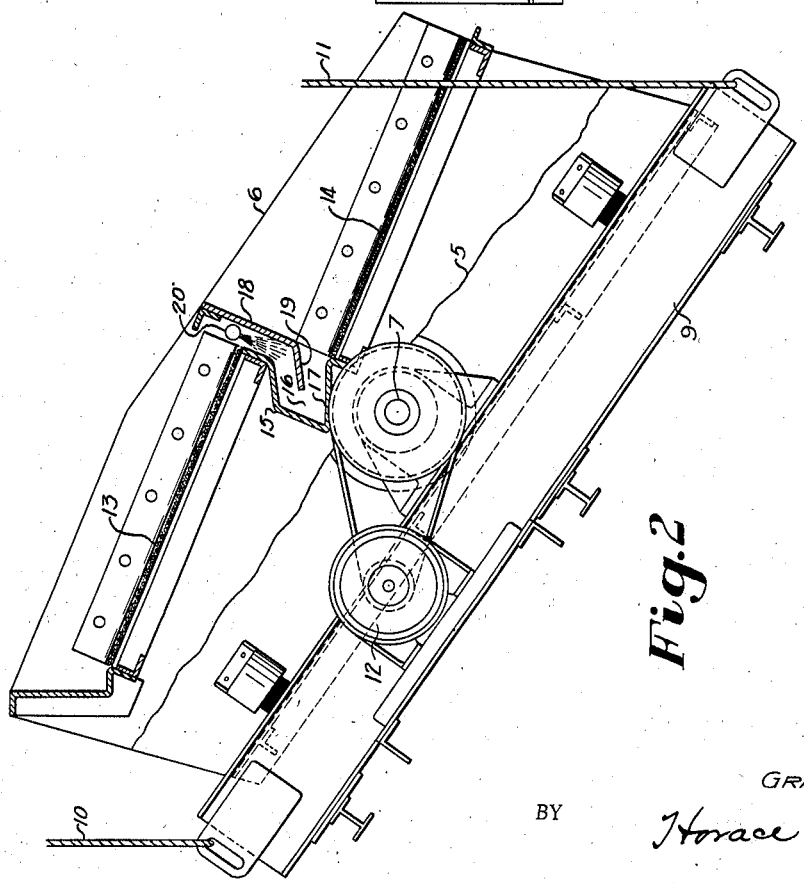
Fig. 2 is a view, partly in side elevation and partly in section, illustrating apparatus whereby the method of the present invention may be practiced.

Referring to Fig. 1, a typical closed-circuit wet-screening operation and grinding operation comprises the grinding of the material in a grinding mill 1, which may be a ball mill, rod mill or the like, and the transfer of the ground material to screening apparatus 2, the construction of which is illustrated in Figs. 2 and 3. The undersize material, which passes through the screen is collected in a hopper 3, while the oversize material is returned to the mill 1 for further grinding to the desired size. Additional material to be ground and screened is preferably introduced into the circuit, as at 4, and water may be introduced, along with said material to form the desired "pulp."

Referring now to Figs. 2 and 3, the screening apparatus is seen to comprise a screen body consisting of spaced plates 5 and 6, suitably interconnected, and mounted upon a shaft 7, carried by bearings 8, which, in turn, are mounted upon a frame 9, such frame being supported in an inclined position by means of cables 10 and 11, carried by an overhead supporting structure. The screen body is adapted to be gyrated in the manner described in Patent No. 2,066,362.

For this purpose, the shaft 7 is rotated by means of a motor 12 which is carried by the frame 9.

Extending transversely of the screen body, between the plates 5 and 6 thereof are screens 13 and 14, of substantially the same fineness, which preferably lie in spaced parallel inclined planes, with the screen 13 in a higher plane relatively to the screen 14. Moreover, the screen 14 is disposed in advance of the screen 13, and in a position to receive material from the screen 13.

Disposed between the screens 13 and 14, and extending transversely of the screen body is a member 15, formed of sheet metal, and of substantially U-shaped cross-section, such member providing a re-pulping chamber 16, the bottom of which is formed by one arm 17 of said U.

Extending transversely of the screen body in advance of the screen 13 is a baffle member 18, having at its lower edge a flange 19, which extends into the re-pulping chamber 16, and is substantially parallel with the arms of the member 15. Between the lower end of the screen 13 and the baffle member 18, a perforated header pipe 20 is disposed, which extends transversely of the screen body and through which water, in regulatable amounts, may be supplied to the repulping chamber 16.

The ends of the screens 13 and 14 are preferably supported upon strips 21 of rubber, which are mounted on bars 22 carried by the screen body, as shown in Fig. 5, and, as an aid in prolonging the life of the members 15 and 18, the latter are preferably lined with rubber 23, as shown in such figure.

In the use of the apparatus which has been described, the pulp, consisting of a mixture of the material to be screened and water in desired quantities, is fed onto the gyrating screen 13, and a portion of the undersize material, together with virtually all of the water passes through this screen and into the hopper 3. The undersize material, together with such of the oversize material as is entrained therein, falls into the repulping chamber 16, and sufficient water is added thereto, by means of the pipe 20, to effect a repulping of such material. The re-pulped material is then shaken onto the screen 14, and the balance of the undersize material is passed through such screen, and into the hopper 3. The oversize material is returned to the mill 1. The amount of water introduced into the repulping chamber is, in this case, sufficient to produce a pulp, which is of such consistency that the undersize material which has not been recovered through the screen 13 will be recovered through the screen 14. Should it be determined that too much water is being added to the repulping chamber, sufficient new material may be introduced into the system at this point to bring the pulp to the proper consistency.

By thus providing a method of wet screening in which the material is screened in separate stages of a single screening operation, and is repulped to the desired consistency between such stages, the separation of all of the undersized material is insured, without appreciable increase in the cost or equipment over the cost and equipment required for ordinary wet screening.

In that form of the apparatus shown in Fig. 4, the screen body is adapted to be gyrated in the same manner as the screen body of Fig. 2, but in this case, three stages of screening, utilizing screens 30, 31 and 32, of substantially the same fineness, are provided with provision made for repulping between such stages, in the form of perforated headers 33 and 34.

Figure 7:
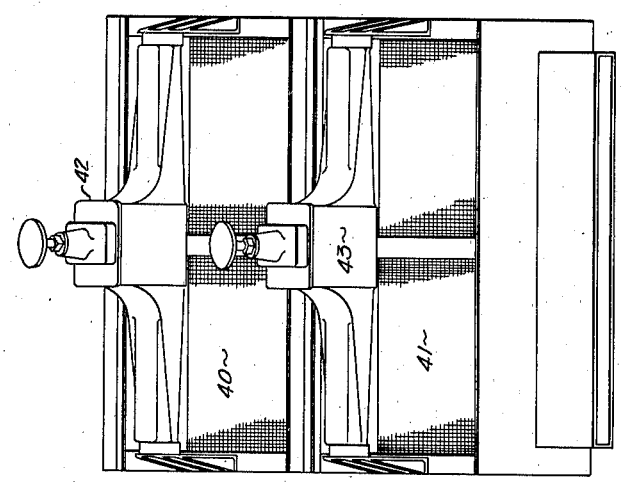
Fig. 7 is an end elevation of the apparatus shown in Fig. 6.
Figure 6:
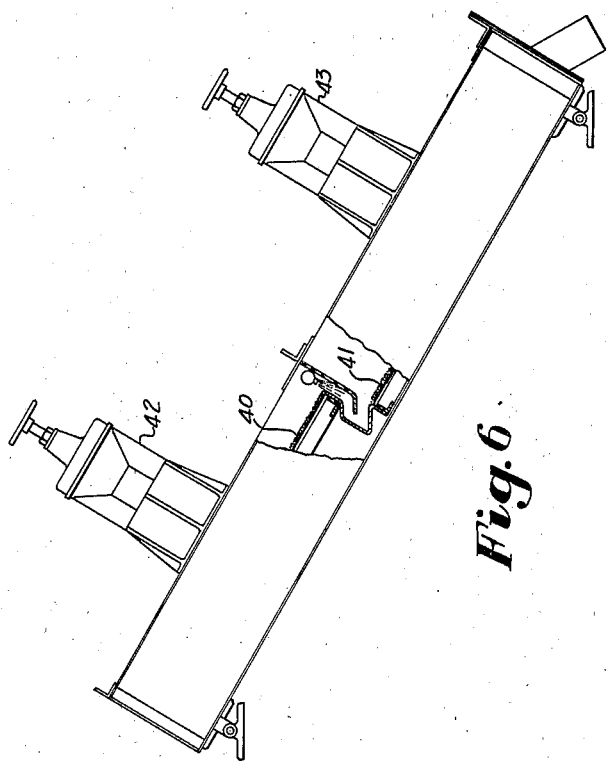
Fig. 6 is a view, similar to Fig. 2, but showing apparatus in which the screens are electro-magnetically vibrated.

In that form of the apparatus shown in Figs. 6 and 7, the arrangement of screens is substantially the same as in Figs. 2 and 3, that is to say, screens 40 and 41 are provided, which lie in spaced inclined planes, but in this case, the screens are adapted to be electro-magnetically vibrated by means of electro-magnetic vibrators 42 and 43 respectively, such means for actuating the screens being described more particularly in United States Patent No. 1,597,826.

It will be understood that the invention is not limited in respect to the number of stages of screening employed or to the specific arrangement of screens which have been illustrated and described, or to the means for actuating the screens which have been illustrated and described, and that various changes in the shape, size and arrangement of parts may be resorted to, without departing from the spirit of the invention, or the scope of the subjoined claims.

Having thus described my invention, I claim:

1. A screening apparatus comprising a plurality of screens arranged at inclined planes with each successive screen lying in a plane below that of the preceding screen, each successive screen being also disposed in advance of the preceding screen and receiving from the latter material passing thereover, repulping chambers interposed between successive screens and means to introduce water into the same, each of said chambers comprising a trough projecting rearwardly beneath the next higher screen and having a bottom wall substantially level with the upper edge of the next lower screen, and a baffle having a portion sloping downwardly and rearwardly to deflect material flowing from said upper screen and repulping water toward the rear of said trough.

2. A screening apparatus comprising a plurality of screens arranged at inclined planes with each successive screen lying in a plane below that of the preceding screen, each successive screen being also disposed in advance of the preceding screen and receiving from the latter material passing thereover, repulping chambers interposed between successive screens and means to introduce water into the same, each of said chambers comprising a trough projecting rearwardly beneath the next higher screen and having a bottom wall substantially level with the upper edge of the next lower screen, and a baffle having a portion sloping downwardly and rearwardly to deflect material flowing from said upper screen and repulping water toward the rear of said trough, said baffles and repulping chambers being lined with resilient material.

3. A screening apparatus comprising a plurality of screens arranged at inclined planes with each successive screen lying in a plane below that of the preceding screen, each successive screen being also disposed in advance of the preceding screen and receiving from the latter material passing thereover, repulping chambers interposed between successive screens and means to introduce water into the same, each of said chambers comprising a trough projecting rearwardly beneath the next higher screen and having a bottom wall substantially level with the upper edge of the next lower screen, a baffle having a portion sloping downwardly and rearwardly to deflect material flowing from said upper screen and repulping water toward the rear of said trough, and means for gyrating said screens.

4. A screening apparatus comprising a plurality of screens arranged at inclined planes with each successive screen lying in a plane below that of the preceding screen, each successive screen being also disposed in advance of the preceding screen and receiving from the latter material passing thereover, repulping chambers interposed between successive screens and means to introduce water into the same, each of said chambers comprising a trough projecting rearwardly beneath the next higher screen and having a bottom wall substantially level with the upper edge of the next lower screen, a baffle having a portion sloping downwardly and rearwardly to deflect material flowing from said upper screen and repulping water toward the rear of said trough, and means for electromagnetically vibrating each of said screens.

GRANT ELLEN.